Dec. 28, 1954  L. P. CROSS  2,697,850
SAUSAGE LINKING MACHINE
Filed Jan. 20, 1951  10 Sheets-Sheet 1
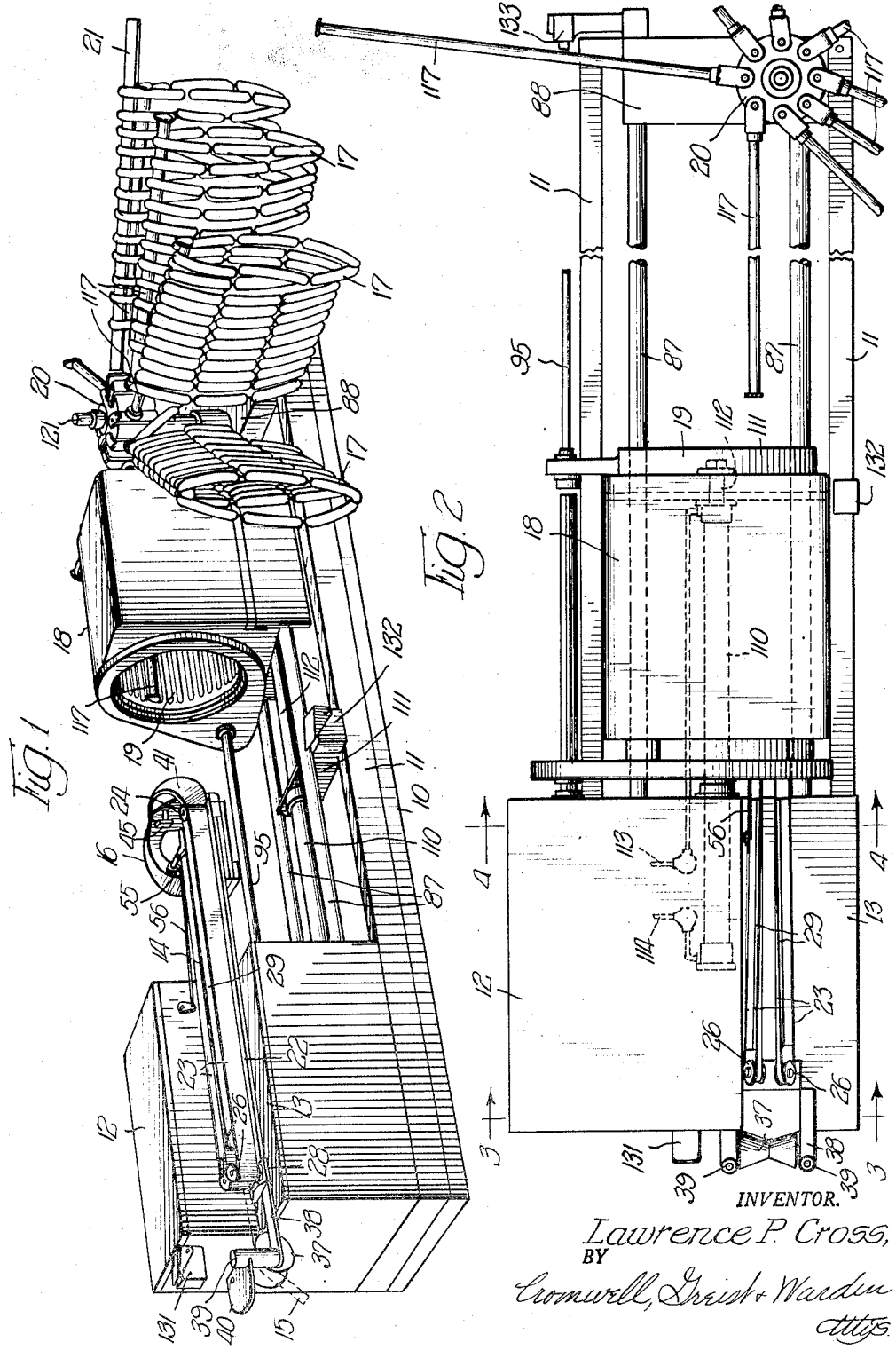
INVENTOR.
Lawrence P. Cross,
BY
Cromwell, Greist & Warden
ATTYS.

Dec. 28, 1954  L. P. CROSS  2,697,850
SAUSAGE LINKING MACHINE
Filed Jan. 20, 1951  10 Sheets-Sheet 2

INVENTOR.
Lawrence P. Cross,
BY
Cromwell, Greist & Warden
Attys.

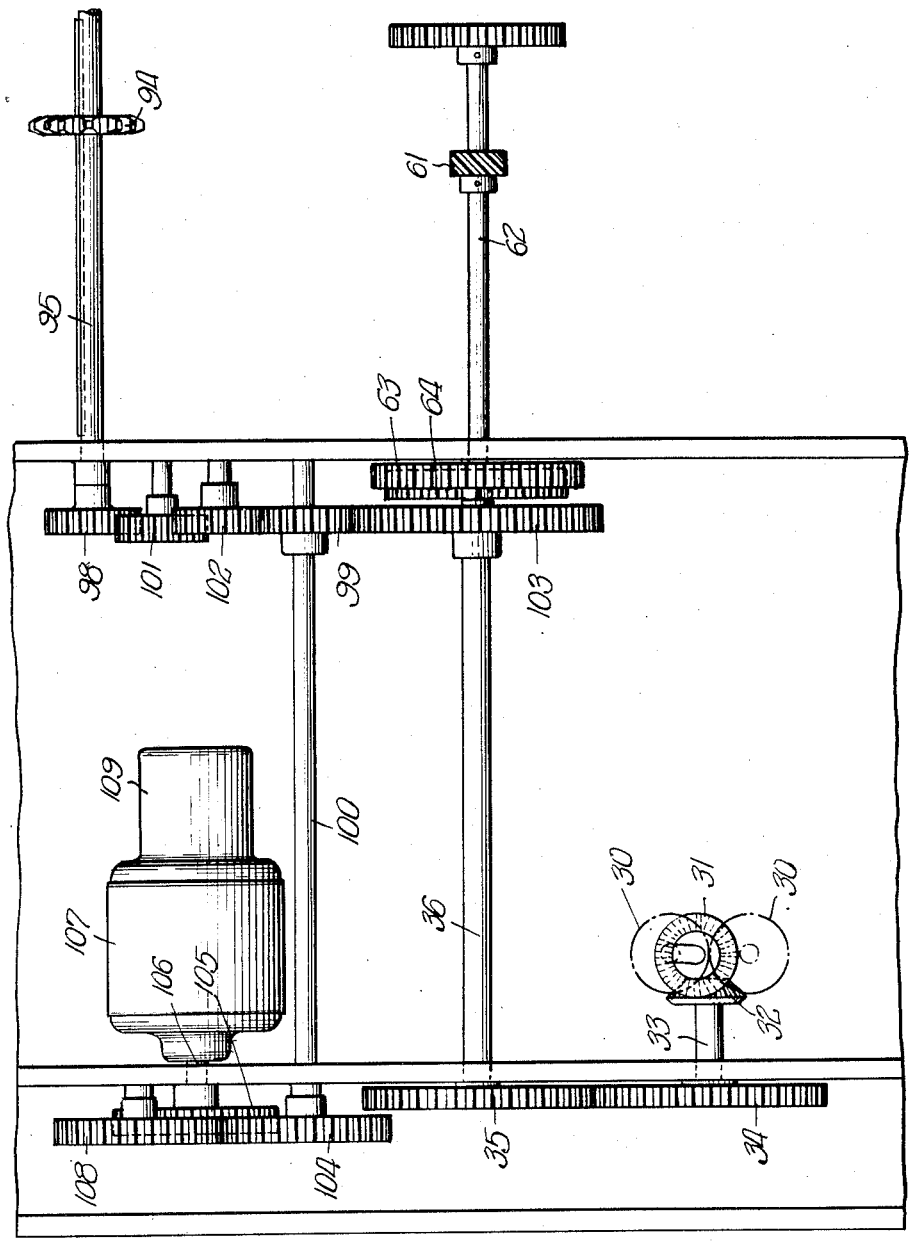

Dec. 28, 1954    L. P. CROSS    2,697,850
SAUSAGE LINKING MACHINE
Filed Jan. 20, 1951    10 Sheets-Sheet 4
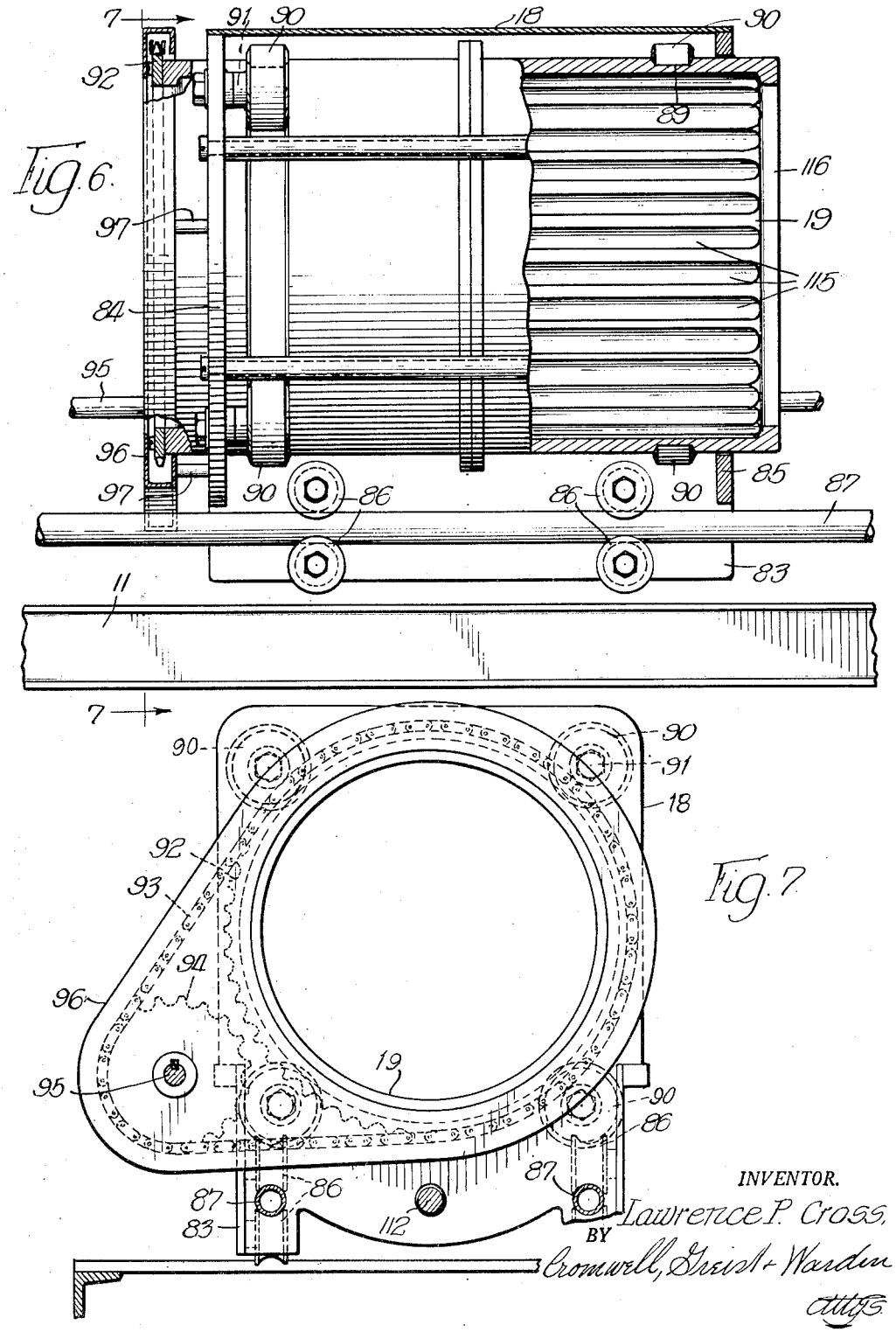
INVENTOR.
Lawrence P. Cross,
BY
Cromwell, Greist + Warden
Attys.

Dec. 28, 1954 L. P. CROSS 2,697,850
SAUSAGE LINKING MACHINE
Filed Jan. 20, 1951 10 Sheets-Sheet 5

INVENTOR.
Lawrence P. Cross,
BY
Cromwell, Greist & Warden
Attys.

Dec. 28, 1954     L. P. CROSS     2,697,850
SAUSAGE LINKING MACHINE
Filed Jan. 20, 1951     10 Sheets-Sheet 6

INVENTOR.
Lawrence P. Cross,
BY
Cromwell, Greist & Warden
Attys.

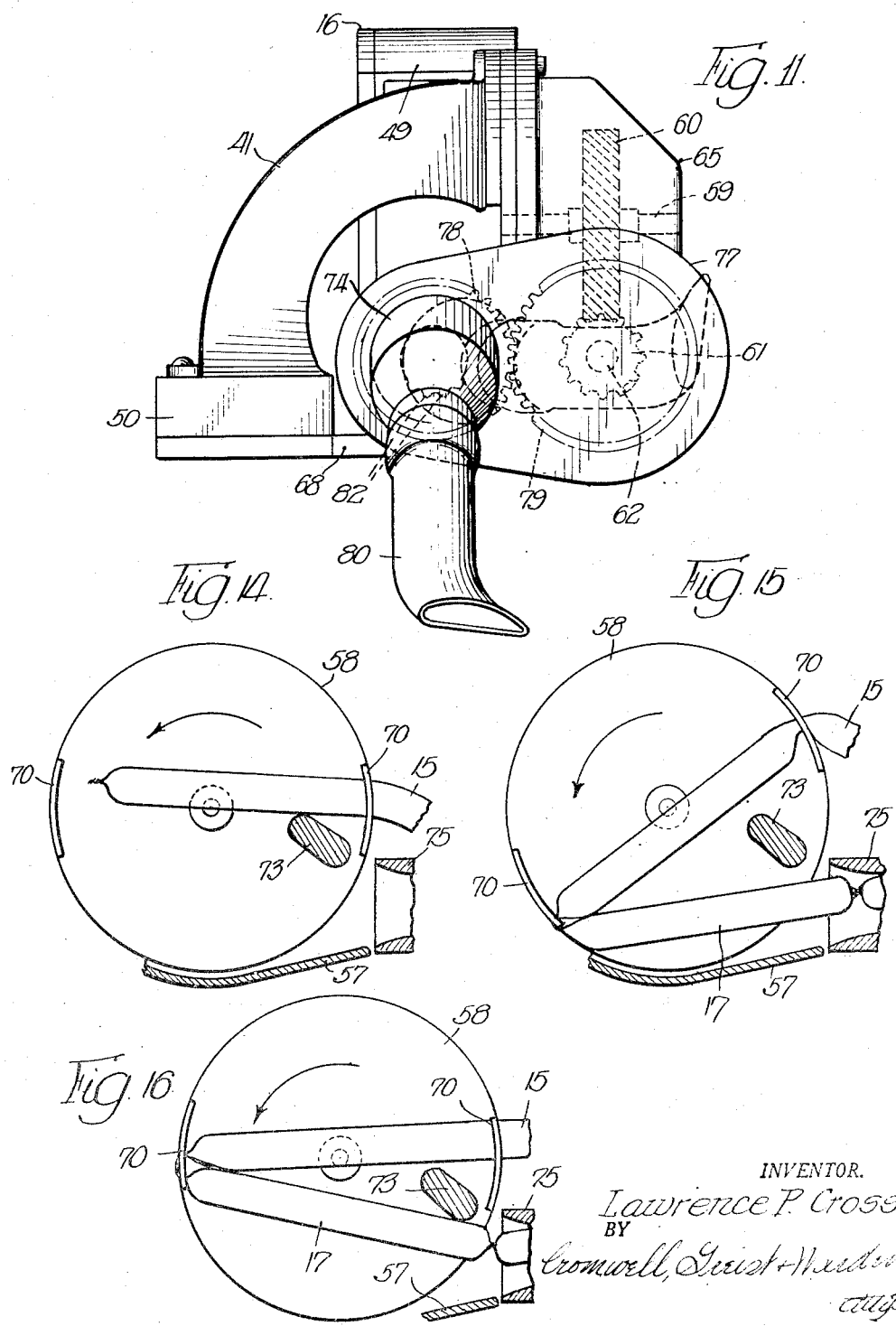

Dec. 28, 1954  L. P. CROSS  2,697,850
SAUSAGE LINKING MACHINE
Filed Jan. 20, 1951  10 Sheets-Sheet 8
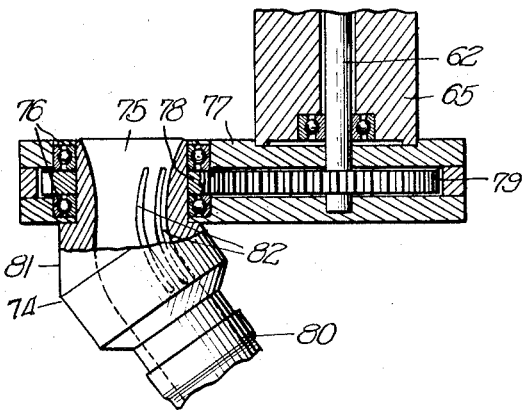
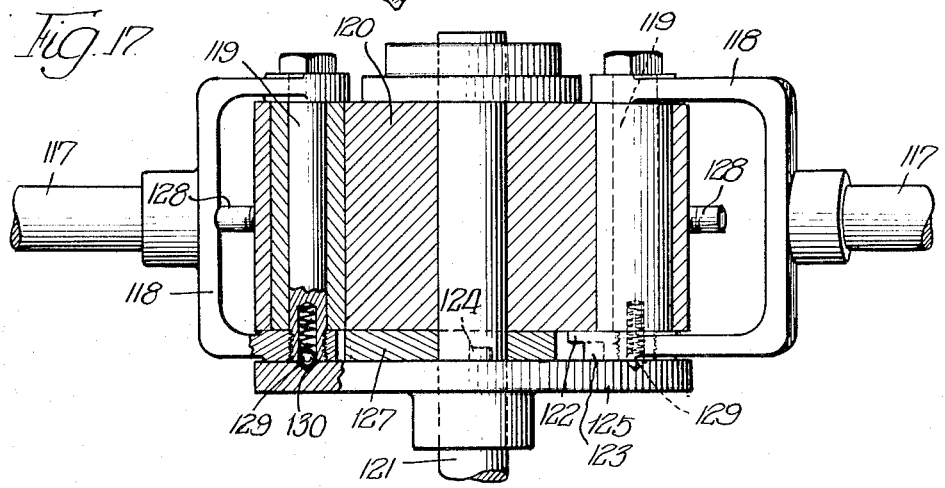
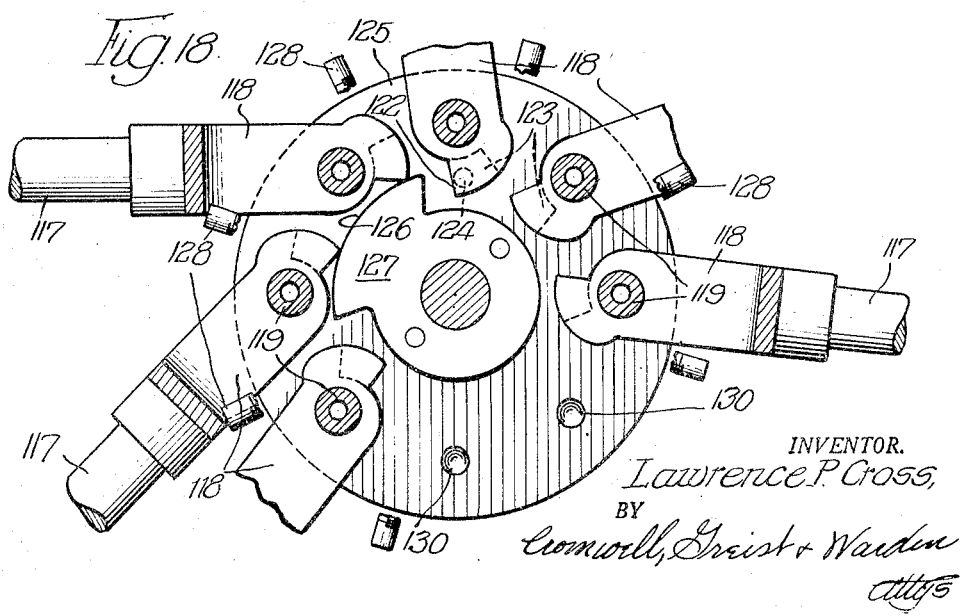
INVENTOR.
Lawrence P. Cross,
BY
Cromwell, Greist & Warden
Attys Dec. 28, 1954  L. P. CROSS  2,697,850
SAUSAGE LINKING MACHINE
Filed Jan. 20, 1951  10 Sheets-Sheet 9
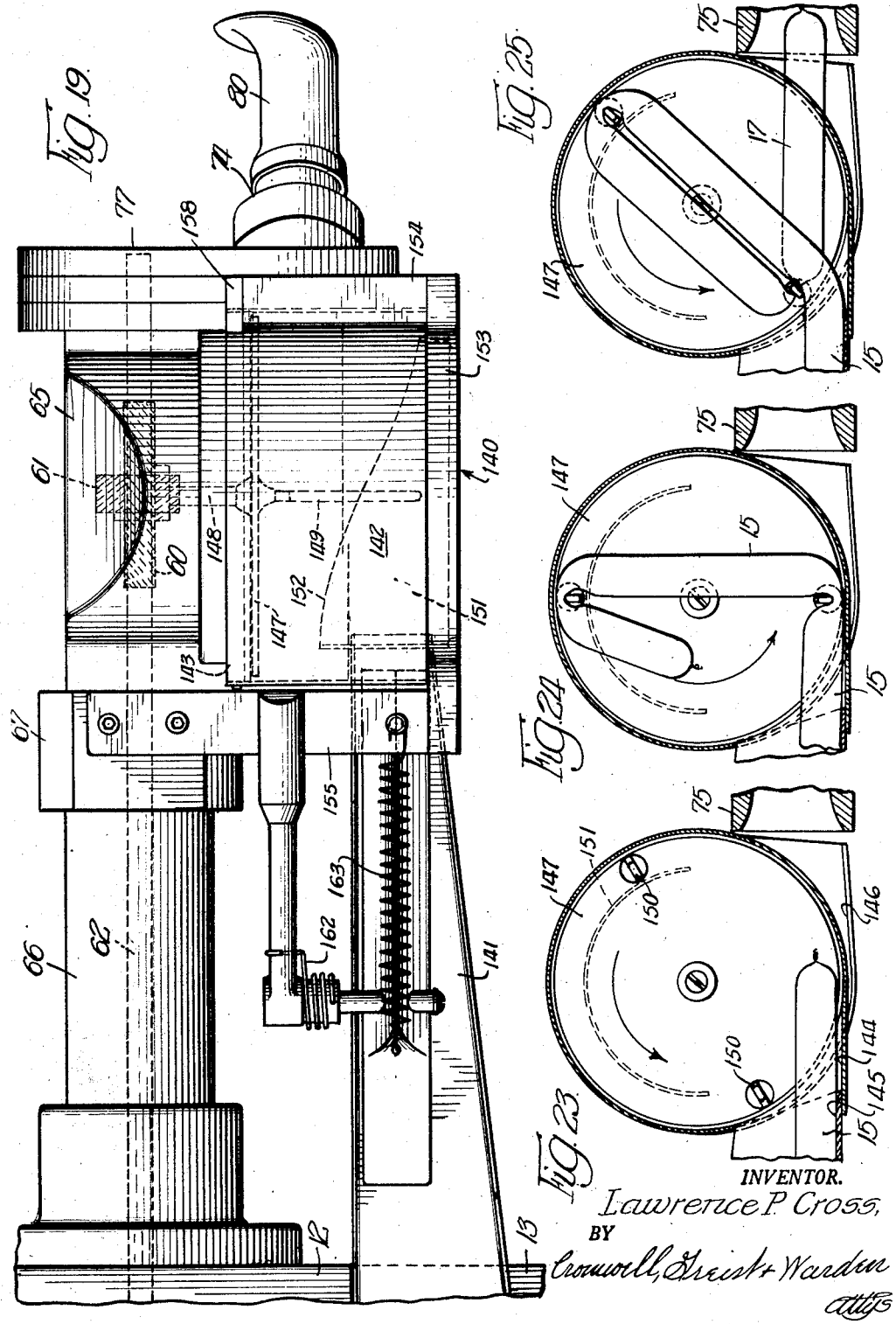
INVENTOR.
Lawrence P. Cross,
BY
Cromwell, Greist + Warden
Attys Dec. 28, 1954
L. P. CROSS
2,697,850
SAUSAGE LINKING MACHINE
Filed Jan. 20, 1951
10 Sheets-Sheet 10
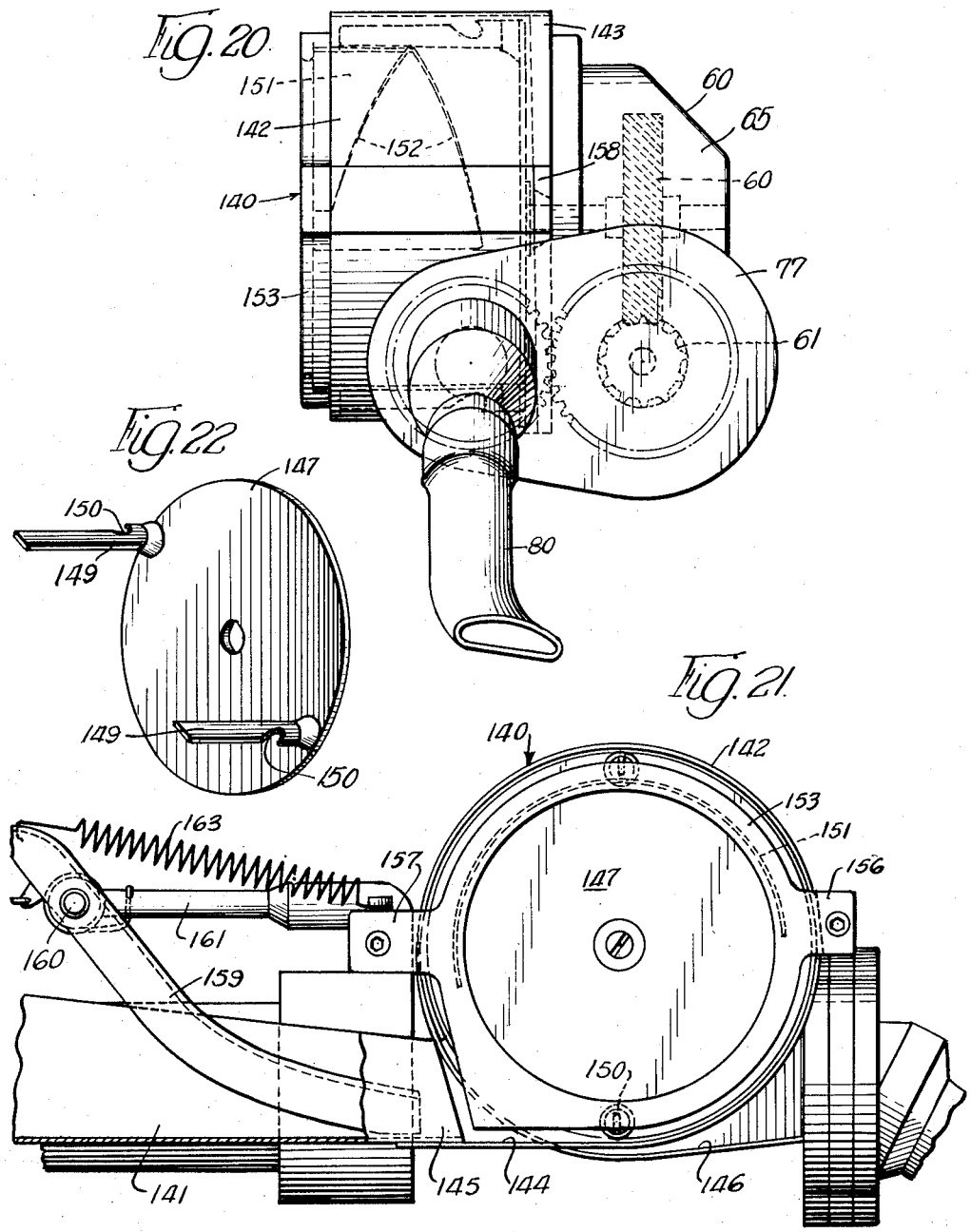
INVENTOR.
Lawrence P. Cross,
BY
Cromwell, Greist & Warden
Attys.

United States Patent Office 2,697,850
Patented Dec. 28, 1954

2,697,850

SAUSAGE LINKING MACHINE

Lawrence P. Cross, Valparaiso, Ind.

Application January 20, 1951, Serial No. 207,021

35 Claims. (Cl. 17—34)

This invention relates to the manufacture of sausages of the character in which a length of filled or stuffed casing is divided into individual sausage links of generally uniform length and a twist is imparted to the casing between successive links.

It is an object of the invention to provide an improved mechanism for the production of link sausages which mechanism will divide a filled casing at predetermined intervals to form individual sausage links of uniform length and automatically rotate successive links in the same direction to provide a twist in the casing in the areas joining the links.

It is another object of the invention to provide a sausage linking machine which will automatically divide a filled sausage casing into sections of predetermined length, which will rotate each successive section to impart a twist in the casing between it and the next succeeding section, which will collect the twisted sections in coil-like fashion in a container as the twisting is completed and which will thereafter position the connected sausages on a supporting rod from which they may be transferred to a smoke stick ready for insertion in the smoke house.

It is a further object of the invention to provide a sausage linking machine which comprises in combination mechanism for continuously feeding a filled sausage casing, mechanism for constricting the casing at spaced points to divide the same into individual sausage links, mechanism for rotating each successive link to impart a twist in the constricted area between the links, and mechanism for collecting the twisted links into a coil as they are delivered from the twisting mechanism and for positioning the coiled links on a supporting rod from which they may be readily transferred to a smoke stick for delivery to the smoke house.

It is a more specific object of the invention to provide a sausage linking machine which comprises in combination means for continuously feeding a filled sausage casing, a rotatable disk having dividing members thereon for constricting the casing at spaced points to divide the same into successive individual sausage links, a rapidly rotating mechanism for imparting a twist in the constricted area between successive links, a rotatable drum-like container for collecting the twisted links into a coil and means for moving the container along a lineal path as the links are delivered thereto from the twisting mechanism and into position over a supporting member to which the coil of links is transferred when the collecting container comes to rest.

It is a still more specific object of the invention to provide a sausage linking machine comprising a conveyor for feeding a continuous length of filled sausage casing, a rotatable disk-like member having a pair of casing constricting members operable in the path of travel of the filled casing to engage the casing at intervals and divide the same into a plurality of successive links of uniform size, a mechanism arranged in close proximity to the dividing mechanism and continuously rotated about an axis generally coinciding with the longitudinal axis of the links as they leave the dividing mechanism for receiving the successive links and imparting a twist at the point where the constricting members engage the casing between the successive links, and a rotating container mounted for axial movement relative to the twisting mechanism to receive the twisted links in a coil-like formation therein.

It is another object of the invention to provide in a sausage linking machine of the type described a twisting and collecting mechanism, comprising a rotatable hub-like member having a passageway which extends from the center thereof in an axially inclined forward direction, and a drum-like container initially encompassing the hub-like member, which is rotatable in the same direction but at a different speed, and which is also movable in a lineal direction along the axis of rotation away from the hub-like member, whereby the sausage links are successively twisted as they move through the passageway and the twisted links are distributed in coil formation around the interior of the drum-like container.

A further object of the invention is to provide in a sausage linking machine of the type described means for continuously feeding a filled sausage casing in a predetermined path and a casing constricting mechanism which comprises a disk mounted for rotatable movement in a plane generally parallel to and adjacent the path of movement of the casing and a pair of laterally extending fingers in opposed relation on the peripheral edge of the disk which are operative in the path of movement of the casing to engage the casing at spaced intervals and divide the same into individual sausage links of uniform predetermined length.

A still further object of the invention is to provide a sausage linking machine of the type described having link forming and accumulating mechanism in which the link accumulating mechanism includes a cylindrical container mounted for relatively rapid rotational movement and relatively slow lineal movement away from the link forming mechanism in combination with a series of bar members arranged to be positioned successively in the lineal path of the cylindrical container whereby the coiled sausage links which are formed and accumulated in the container are received in looped arrangement on a bar member when the container comes to rest after the link forming and twisting operation is completed.

These and other objects of the invention will be apparent from a consideration of the sausage linking machine which is shown by way of example in the accompanying drawings, wherein:

Fig. 1 is a perspective view of a sausage linking machine embodying the principles of the invention;

Fig. 2 is a plan view of the machine with the link accumulating cylinder in a different position and with portions of the machine broken away;

Fig. 5 is a plan view partly schematic, of the drive mechanism for the machine;

Fig. 6 is a partial side elevation of the link accumulating mechanism, with portions broken away and to an enlarged scale;

Fig. 7 is an end view of the accumulating mechanism taken generally on the line 7—7 of Fig. 6;

Fig. 11 is an end elevation of the dividing and twisting head, the view being taken in a plane extending transversely of the machine;

Fig. 12 is a detail view partly in section of a portion of the twisting head;

Figs. 14, 15 and 16 are schematic views illustrating the dividing and twisting operation;

Figs. 17 and 18 are detail views partly in section of the rack structure;

Fig. 19 is a plan view of the link dividing and twisting head portion of a modified form of the machine;

Fig. 20 is an end elevation of the dividing and twisting head shown in Fig. 19;

Fig. 21 is a side elevation of the mechanism shown in Fig. 19;

Fig. 22 is a perspective view of the divider plate mechanism; and

Figs. 23, 24 and 25 are schematic views illustrating the operation of the dividing head of Fig. 19.

Figure 4:
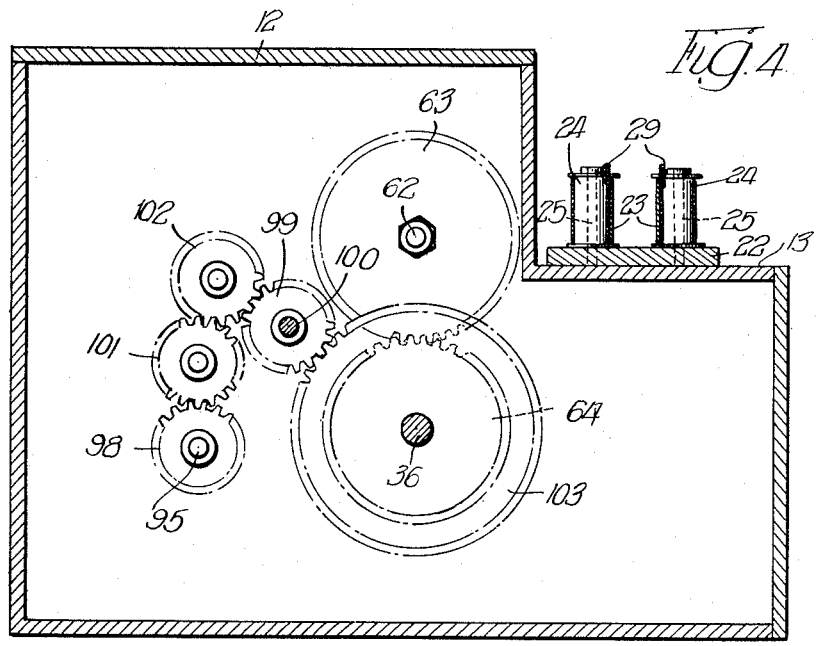
Fig. 4 is a cross section taken generally on the line 4—4 of Fig. 2, to an enlarged scale.
Figure 3:
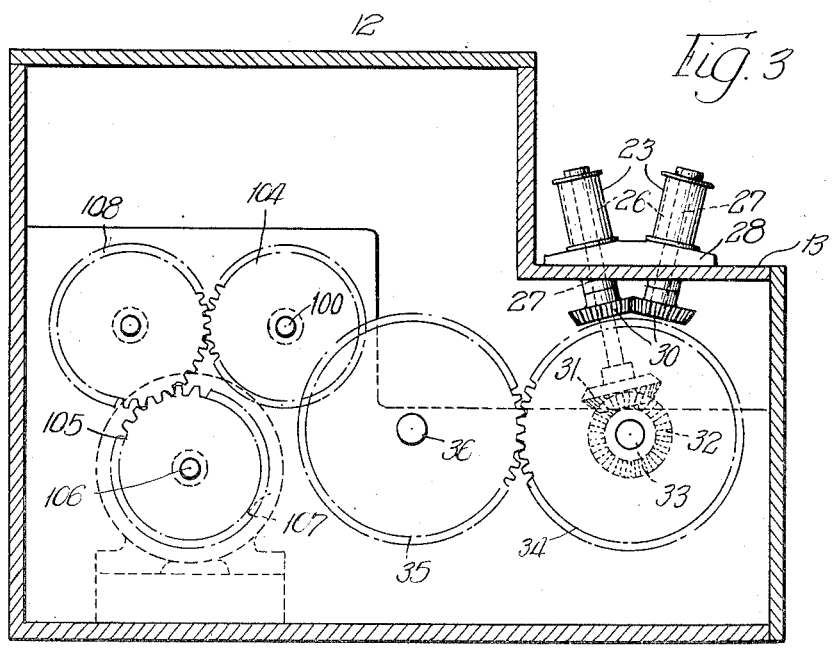
Fig. 3 is a cross section taken generally on the line 3—3 of Fig. 2, to an enlarged scale.
Figure 8:
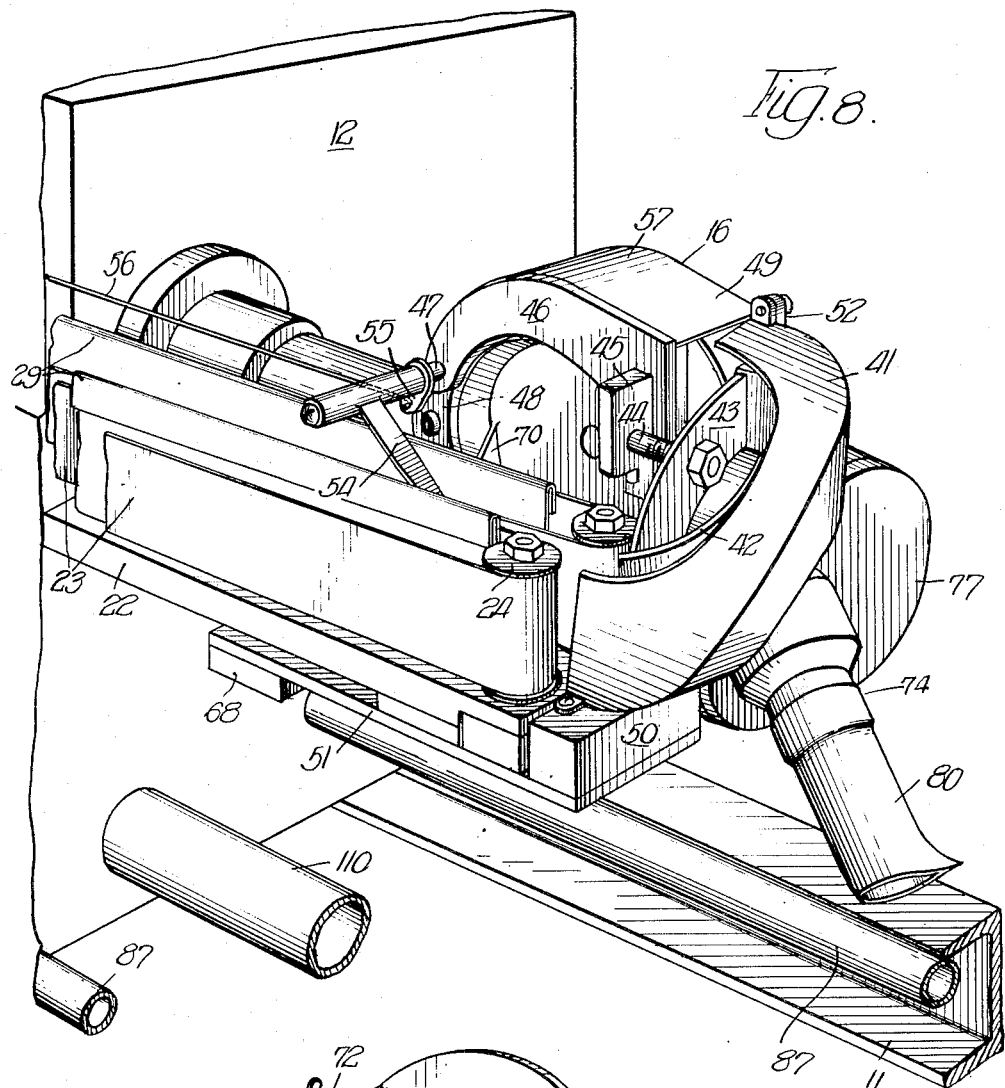
Fig. 8 is a perspective view of the dividing and twisting head mechanism, to an enlarged scale.
Figure 13:
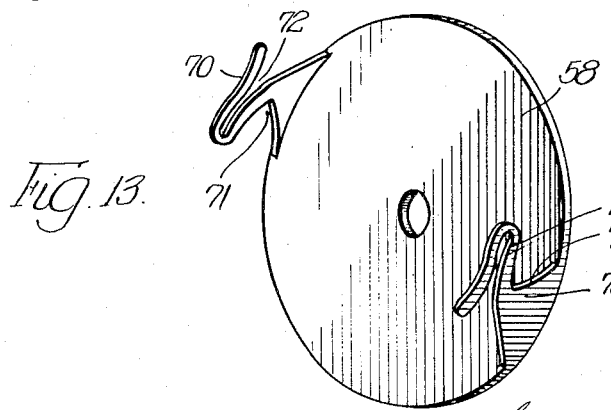
Fig. 13 is a perspective view of a portion of the dividing mechanism.
Figure 9:
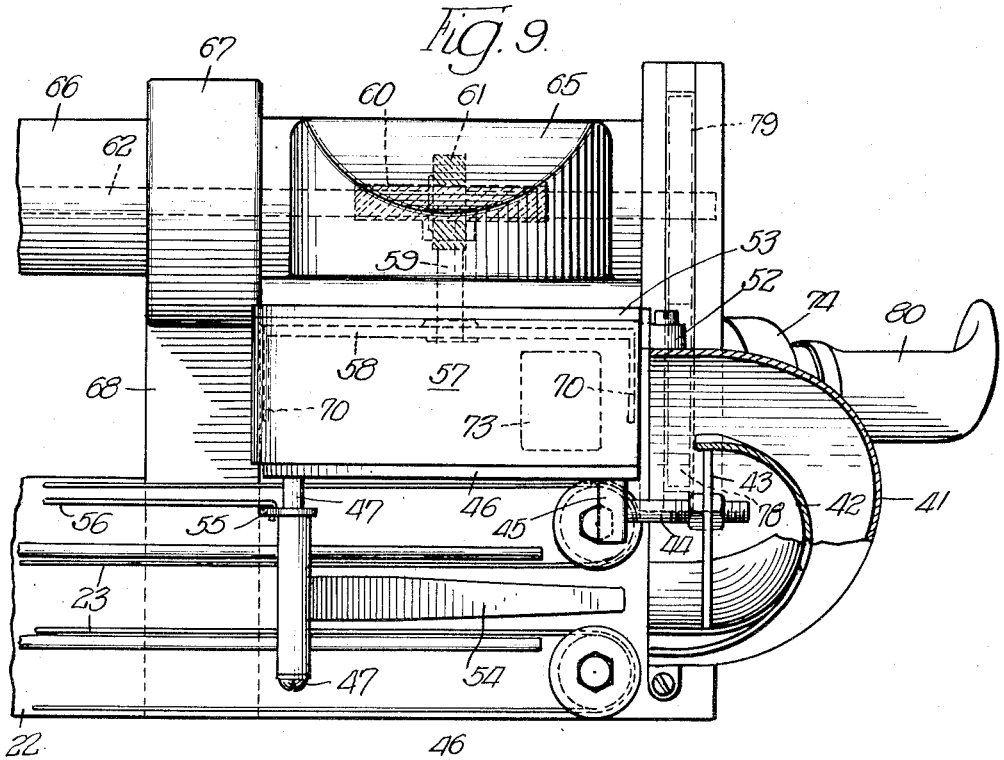
Fig. 9 is a plan view of the dividing and twisting head shown in Fig. 8 with portions broken away.
Figure 10:
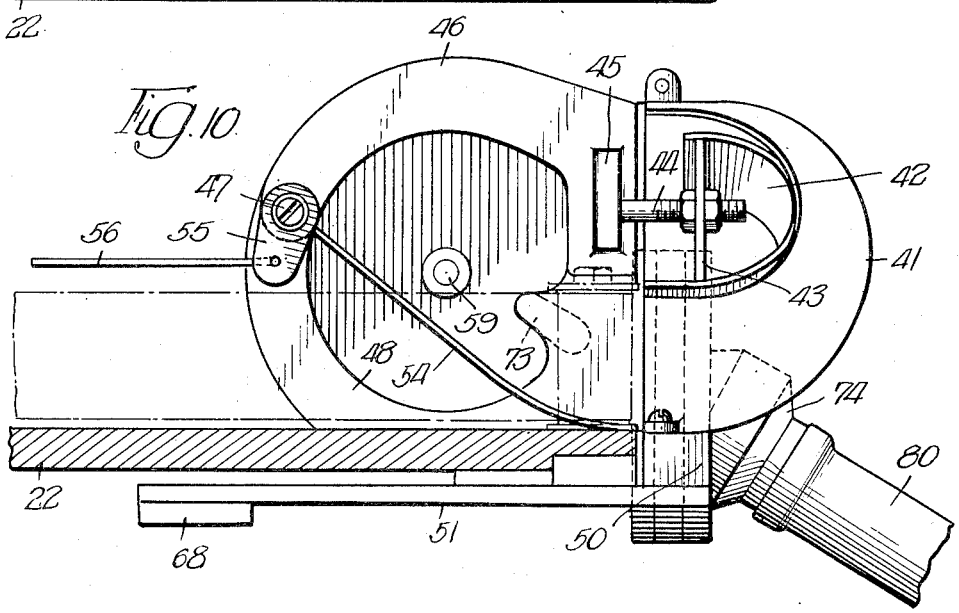
Fig. 10 is an elevation of the dividing and twisting head.

Referring to Figs. 1 to 18 of the drawings, there is shown a mechanism constructed in accordance with the principles of the invention which will divide a continuous length of filled sausage casing into a plurality of links of predetermined length, which will successively rotate each link relative to the remainder of the filled casing to impart one or more twists between it and the next succeeding link, which will accumulate the twisted links in coil-like arrangement in a receptacle and which will deposit the coiled links on a receiving bar for transfer to a smoke stick.

The present mechanism is similar to the mechanism disclosed in the applicant's Patent No. 2,674,004, issued April 6, 1954 and constitutes a further development of the same.

The illustrated mechanism comprises (Figs. 1 and 2) a supporting frame structure including a longitudinally extending table-like bottom support member 10 and upstanding longtiudinal side rails 11. At one end of the rails 11 there is mounted a main casing or housing 12 having a longitudinal recess providing a ledge formation 13 along an upper side edge for supporting thereon a mechanism 14 for guiding and feeding a filled sausage casing, indicated at 15, and a mechanism 16 for dividing and twisting the same to form individual sausage links 17, the latter extending forwardly a substantial distance from the casing 12. A carriage 18, having an inner rotatable link accumulating cylinder 19, is mounted for longitudinal reciprocal movement between the casing 12 and the other end of the supporting frame member 10. A movable bar or rack structure 20 is arranged at the end of the path of movement of the carriage 18 for receiving successive strings of the sausages 17 from the revolving cylinder 19 when the carriage 18 reaches the end of its movement and comes to rest, each string of sausages 17 being subsequently removed from the machine on a smoke stick 21.

The casing feeding structure 14, by means of which the filled sausage casing 15 is initially fed, is supported on the ledge formation 13 of the casing 12 by means of a longitudinally extending bottom plate 22 which also supports the casing dividing structure 16. The feeding structure 14 comprises a pair of feed belts 23 arranged with their inner runs in vertical extending generally parallel relation, the forward ends being supported on laterally spaced idler rollers 24 (Figs. 4 and 8) which are mounted on stub shafts 25 extending upwardly from the supporting plate 22. At the other, or receiving end, the belts 23 are supported on driven rollers 26 (Fig. 3) which are fixed to stub shafts 27 extending upwardly from a supporting block 28. The upper faces of the block 28 are beveled and in angular relation to each other so that the rollers are in upwardly diverging relation to provide a trough-like formation between the belts 23. A backing or guide plate 29 is arranged along the inside of the belts 23. The roller shafts 27 extend within the casing 12 and carry interengaging beveled gears 30. One of the shafts 27 is extended downwardly and carries on its end a beveled gear 31 which engages with a cooperating gear 32 on a driven shaft 33 (Fig. 5). The shaft 33 is driven by the gear 34 which engages in driving relation with the gear 35 on the drive shaft 36.

A guide roller 37 having a grooved surface for receiving the casing 15, is supported on a rearwardly extending bracket member 38 which also carries at its outer end a pair of laterally spaced upstanding guide posts 39 and a top guard plate 40. The grooved surface of the guide roller 37 is aligned with the trough-like space formed between the feed belts 23 at the supporting rollers 26.

Adjacent the forward end of the feed belts 23 and extending forwardly and upwardly therefrom there is arranged a guide channel 41, of generally U-shaped section, into which the casing 15 is fed by the belts 23 and which reverses the direction of movement of the casing 15 and guides it in an upward and outward path relative to the belts 23 and into the divider head 16. An inner side wall 42 of the guide channel 41 is mounted for swinging movement away from the channel 41. The side wall 42 is generally C-shaped and is connected at the ends by a cross piece 43 which is adjustably secured on the end of a stud 44 which extends forwardly from a small vertical supporting block 45. The block 45 is carried by the forward end of a plate 46 which is pivotally mounted at its other end on a stud 47 extending laterally of the apertured front plate 48 on the housing or casing 49 which constitutes part of the divider head 16. The position of the channel wall member 42 may be adjusted relative to the divider head 16 and the guide channel 41 to increase or decrease, within certain limits, the tension in the filled casing 15 as it moves into the divider head 16.

The guide channel 41 is supported at the lower end on a block 50 which is secured at the outer end of a plate 51 mounted beneath the longitudinally extending supporting plate 22. The upper end of the guide channel 41 is secured by a bracket plate 52 to the forward end of a back plate 53 which constitutes the rear wall of the divider housing 49. The divider housing 49 is open at the front and the sausage 15 is directed into the upper forward part of the same by the guide channel 41.

A switch operating control member or finger 54 is provided between the feed belts 23 adjacent the head 16 which is pivotally mounted on the pin 47 and which carries a crank arm 55 connected by a rod 56 with an electrical switch device (not shown) which controls the operation of the machine in a manner to be described.

The divider head casing or housing 49 includes a peripheral band member 57 which is somewhat wider than the diameter of the sausage casing 15 and which connects the front and back plates 48 and 53 except at the forward end. A rotatable divider plate 58 is mounted in the compartment formed by casing members 48, 53 and 57, and on the end of a shaft 59 which extends laterally through and is journaled in the back plate 53. At the other end the shaft 59 is provided with a gear 60 which engages in driving relation with a gear 61 on the longitudinal shaft 62. The shaft 62 extends from the main casing 12 and carries at its other end the gear 63 which is in driving relation with the gear 64 on the main drive shaft 36. A cover member or housing 65 encloses the shaft 59, gear 60 and forward portions of the shaft 62. The remainder of the shaft 62 is enclosed in a housing 66 and is mounted in suitable bearings in the end of the main casing 12 and in the cross support 67 which is mounted on plate 68 extending laterally from the end supporting plate 51 beneath the longitudinal plate 22. The shaft housing 66 extends forwardly from the main casing 12, to which it is attached at the one end, to the gear housing 65 which supports on its side face the back plate 53 of the divider housing 49.

The rotatable divider plate 58 which is mounted in the divider housing 49 is circular and carries on its peripheral edge a pair of divider fingers or plates 70 (Fig. 13) which are of generally triangular shape and which are secured along the edge to the face of the plate 58 in laterally extending relation to the same. An inwardly extending curved recess 71 is provided in one outwardly extending edge while in the opposite edge there is provided a generally V-shaped inwardly extending recess 72. The plates 70 are curved to conform to the periphery of the plate 58 and the recesses 71 and 72 are disposed in the opposite edges of the plate 70 so that they open outwardly in directions opposite to each other with curved side portions and with the inner extremities offset as shown.

As illustrated in Figs. 14 to 16, the plate 58 rotates counterclockwise and the divider fingers 70 are successively brought beneath the casing 15 as it emerges from the guide channel 41 and moves across the face of the plate 58. The casing 15 is engaged in the recess 71 of the upwardly moving divider finger 70 and as the plate 58 continues to rotate, a length of the filled casing 15 is divided off from the remainder. At the beginning of the operation the length divided off may be of any size (Fig. 14) but as successive lengths are divided off the size of each length will be the same as the distance between the divider fingers 70 (Figs. 15 and 16). When the plate 58 is rotated through an angle of 180° the divider member 70 turns to position its recessed edges in opposite or reversed relation while engaging the sausage casing in a relatively small area extending from the recess 71 across the outer face of the member 70 and into the recess 72 on the opposite edge thereof. This movement results in a constriction of the casing at the area of engagement and a dividing off of successive short lengths or sections of the casing 15 to form individual links. As the plate 58 rotates between 180° and 360° the completely divided link 17 (Fig. 16) is twisted, in a manner which will be described, and moved forwardly out of the housing 49. An abutment block 73 is arranged in the housing 49, extending transversely of the same and slightly beneath the center of the rotation of the plate 58, so that it is adjacent the path of movement of the divider member 70 and in position to insure movement of the link 17 forwardly and out of the housing 49.

As the links 17 leave the divider housing 49 they enter a twisting mechanism 74 which includes a throat forming ring member 75 which is rotatably mounted in a pair of ring bearings 76 in a three plate gear housing 77 and which carries on its outer periphery a ring gear 78. The gear 78 engages with a driving gear 79 on the end of the longitudinal drive shaft 62. The three plates which constitute the housing 77 are properly recessed or apertured to receive the throat ring 75 and its supporting and driving members. The housing 77 is supported on the forward end of the gear and shaft housing 65. The throat member 75 has attached thereto a hollow distributor 80 in the form of a tubular section which is connected to the throat member by a base portion 81 so that it is in angular relation to the throat member and rotates with the same in a conically shaped path. The hollow distributor 80 provides an angular path for the sausages 17 as they move forwardly and outwardly of the throat ring 75 so that the sausages are directed outwardly away from the longitudinal axis of the throat member 75 and delivered to the interior of the rotatable accumulating cylinder 19 in the carriage 18. The interior surface of the throat ring 75 is provided with grooves or corrugations 82 which extend into the distributor 80 for a short distance to assist in the rotation of the sausages.

As the sausages move through the throat member 75 the rotation of the latter causes rotation of the sausages about their longitudinal axis. This rotation imparts one or more twists to the restricted casing area between the successive sausages. The twisting begins when the divider plate 58 has measured off a sausage length and reaches a position approximately that shown in Fig. 15, the twisting being effective upon the connecting casing area between the sausage entering the throat member 75 and the next succeeding sausage extending between the divider fingers 70. As the sausages emerge in a connected string from the rotating distributor tube 80 they are positioned in coil-like formation in the revolving accumulating cylinder 19. The rotation of the divider plate 58 and the twisting mechanism 74 is synchronized so that the desired number of twists are obtained in each connecting casing area. The mechanism is operated at relatively high speed to take advantage of the effect of centrifugal force in performing the twisting operation.

The carriage 18 which carries the rotatable accumulator cylinder 19 consists of an outer casing or frame of generally rectangular cross section having depending side walls 83 and end walls 84 and 85. The side walls 83 are provided with pairs of supporting rollers 86, along their lower margins which are adapted to ride on track forming longitudinally extending guide or support rods 87 arranged parallel to and inwardly of the side rails 11 and extending from the main casing 12 at one end of the frame to a supporting block 88 at the other end of the same.

The revolving cylinder 19 comprises a tubular section having longitudinally spaced peripheral grooves 89 providing tracks for receiving roller bearing members 90 which are supported on shafts 91 extending inwardly of the end plates 84, 85. Adjacent the plate 84 at the rear end of the carriage 18 the accumulator or pan member 19 is provided with a sprocket ring 92 which is connected by a chain 93 with a smaller sprocket 94 splined on a longitudinally extending shaft 95 which is supported in bearings in the forward end of the main casing 12 and in the cover member 96 which is supported in spaced relation to end plate 84 by posts 97 and which encloses the sprockets 92 and 94 and the chain 93. The drive sprocket 94 is mounted in sliding relation on the shaft 95 and the latter is slidable in the supporting bearings in the cover member 96.

The drive shaft 95 carries at its other end, within the casing 12, a gear 98 which is connected in driving relation with a gear 99 on the shaft 100 through the intermediate gears 101 and 102. The gear 99 engages a gear 103 which is secured on the main drive shaft 36 so that the latter is driven from the power shaft 100. The shaft 100 is provided at its other end with a gear 104 which is driven from the gear 105 on the drive shaft 106 of a motor 107 through the intermediate idler gear 108. The motor 107 is provided with a brake mechanism 109.

The carriage 18 is moved in a lineal path along the guide rods 87 by means of a hydraulic cylinder 110 which extends from casing 12 to a cross supporting member 111 connected between the side rails 11 and spaced forwardly of the casing 12. The plunger member 112 of cylinder 110 is connected at the outer end to a downwardly extending portion of the end plate 85 on the carriage 18. The hydraulic cylinder 110 is supplied with oil or other suitable operating fluid through the pipes 113 and 114 which fluid is controlled by suitable electrically operated valves (not shown). The accumulator cylinder 19 is provided on its internal surface with a series of peripherially spaced longitudinally extending grooves 115 which terminate at the inturned lip or shoulder 116 at each end of the cylinder. The carriage 18 is arranged to move the cylinder 19 from a position closely adjacent the main casing 12 (Fig. 2) where is surrounds the head 16 to a position adjacent the end of the machine where it is adapted to receive one of a plurality of supporting bar members 117 of the rack structure 20.

The bars 117 (Figs. 2, 17 and 18) are each secured at one end to yoke 118 which is pivotally mounted on a pivot pin 119 on a supporting hub 120 which is in turn rotatably mounted on the top of an upstanding post 121. The yokes 118 are circumferentially spaced around the hub 120. The lower arm of each yoke 118 is provided at the end with a cam formation 122 which is undercut to provide an abutment formation 123. The abutment 123 engages with an upstanding pin 124 on a plate 125 which is fixed on the post 121 below the hub 120 and swings the yoke 118 about its pivot 119 to position the cam formation 122 on the yoke arm for engagement with the cam surface 126 on a fixed cam 127 when the hub is rotated counterclockwise. Adjustable stop members 128 spaced around the periphery of the hub 120 limits the movement of the yokes 118 in the counterclockwise direction and holds the cam 122 in engagement with the cam surface 126 throughout the extent of the latter, whereby the arm 117 is held in non-rotatable relation to the pivot 119 for the distance the cams 122 and 126 are in engagement. Each yoke 118 is provided with a spring pressed ball 129 which is adapted to engage in indexing recesses 130 properly spaced around the margin of the top surface of fixed plate 125. With the arrangement described and shown the supporting bars 117 may be indexed to bring each one successively in proper alignment to extend into the cylinder 19 and receive a coil of completed sausage links 17 at the end of the movement of the carriage 18 after each twisting operation, by merely rotating the hub 120. The length of the cam surface 126 is such and the indexing recesses 130 are so positioned that while one bar 117 is held in position to receive a load of sausages from the cylinder 19 the preceding bar 117 is held in a fixed position so that it cannot swing back and interfere with the movement of the carriage 18. When the cam surfaces 122 and 126 are disengaged each bar 117 is free to rotate about its mounting pin 119. All that is necessary to properly position an empty bar 117 for entry into the cylinder 19, as the carriage moves toward the end of the machine, is for the operator to grasp any one of bars 117 and index the hub 120 to bring the desired bar 117 around to the position shown in Fig. 2 where its cam 122 will be in engagement with the fixed cam 126 and the spring pressed, indexing member 129 will be seated in the proper recess 130.

The machine is provided with suitable electric mechanism for controlling the operation of the motor 107, the brake 109 which is associated with the motor 107, and the hydraulic mechanism for moving the carriage 18. None of the specific control mechanisms have been illustrated, since the particular devices employed for this purpose may be varied and since the control arrangements do not constitute a part of the present invention except for the relative speed and sequence of operation of the parts. In this connection control switches for starting and stopping the machine are located within convenient reach of the operator as indicated at 131 and 132 in Figs. 1 and 2.

In operating the machine the motor 107 is started to place in operation the feed belts 23, the rotating mechanism in the divider head 16 including the divider plate 58 and the twisting mechanism 74 and the rotating drive for the cylinder 19. A length of filled sausage casing 15 is then threaded over the guide roller 37 and between the feed belts 23, the leading end of the casing being first tied in a knot. As the casing is fed forwardly by the movement of the feed belts 23 it engages and lifts the control finger 54 which actuates, through rod 56 and suitable switches, the hydraulic mechanism for the accumulating cylinder 19, the carriage 18 being initially in the position shown in Fig. 2. As the filled sausage casing 15 moves through the guideway 41 and into the divider housing 49 it is engaged at some distance from the leading end by one of the pair of divider plates or fingers 70 on the disk 58, the casing 15 being received in the groove 71 as the finger 70 moves upwardly in its circular path. As the disk 58 rotates through 180°, the direction of movement of the divider finger is reversed, having moved across the top of its path and started down on the other side. The other one of the divider plates 70 moves correspondingly and engages the sausage casing 15 as it moves around to the front of the compartment 49 and upwardly beneath the incoming sausage 15. Successive lengths of the casing 15, each of a size to form a link 17 are thus divided off from the casing, the casing being initially engaged at successive spaced points in the recesses 71 of the divider plates and upon rotation of plate 58 the point of engagement being transferred from recess 71 to recess 72 by the reversal of the direction of movement of the leading edge of the divider plate. As each successive section of the casing 15 is divided off and moved into the throat member 75 of the twisting head 74 by rotation of the plate 58 the casing area between it and the next succeeding sausage is subjected to a twisting action by rotation of the twisting head, one or more twists being made, depending upon the speed of the twisting mechanism. The twisting of the link as it moves out of the divider mechanism begins when the mechanism is approximately in the position shown in Fig. 15. As the successive twisted links 17 move through the head 74 they are guided by the tubular member 80 radially outwardly of the head 74 and arranged in coil formation within the rotating accumulating cylinder 19. The length of each link 17 is dependent upon the distance across plate 58 between the divider fingers 70 and the tension in the casing 15 which may be varied somewhat as explained by adjustment of wall 42 of the guideway 41.

The control finger 54 is connected to control valves for the hydraulic mechanism for longitudinally moving the carriage. As the successive links are delivered within the cylinder 19 the carriage 18 is slowly moved forwardly away from the head 16 with sufficient speed to permit the coiling of the links within the cylinder 19 without movement of the links relative to the wall of the cylinder. The grooves 115 in the cylinder 19 assist in holding the coiled links in position on the wall of the cylinder where they are deposited and restrained against the action of centrifugal force. As the trailing end of the casing 15 passes the control finger 54 the latter drops to the bottom of the feed channel and actuates the hydraulic mechanism to move the carriage 18 at a faster rate of speed toward the outer end of the machine with the cylinder 19 still rotating rapidly and with the sausages retained in coil arrangement in the cylinder 19.

Prior to the completion of the twisting operation an empty support bar 117 is indexed into proper alignment for receiving the coils of sausages from the cylinder 19. When the carriage 18 reaches a position near the end of the machine an abutment member on the carriage 18 strikes the switch 133 which stops the motor 107 and actuates the brake 109 to quickly bring the cylinder 19 to a standstill and allow the coils of sausages 17 to drop onto the bar 117 in depending coiled relation as shown in Fig. 1. The switch 133 also actuates the hydraulic mechanism to cause return movement of the piston 112 to bring the carriage 18 back into position for repeating the twisting operation. The strings of sausages 17 may be removed from the supporting bars 117 by merely inserting a smoke stick 21 within the coil and transferring the sausages to the stick. The rotation of the dividing and twisting head 16 may be continuous as well as the movement of the feed belts 23, with the movement of the cylinder 19 and the carriage 18 being initiated and controlled as required. Successive lengths of filled casing 15 may be fed to the machine by the operator with the dividing, twisting, accumulating and delivering operations being performed automatically as described. The machine has been operated to produce 5½ inch links with two turns or twists in the casing between the links at the rate of 300 links per minute with a speed of 650 R. P. M. for the twisting head and 600 R. P. M. for the accumulating cylinder. Higher speeds have been attained by reducing the number of twists between the links.

Referring now to Figs. 19 to 25, there is illustrated a modified form of the machine which incorporates a different casing feeding and divider head structure. All parts of the modified machine which are not shown in these figures are the same as in the form of the machine shown in Figs. 1 to 18, and those parts shown in Figs. 19 to 25 which are identical with the corresponding parts in the previously described machine are identified by the same numerals.

In the form here illustrated the sausage casing 15 is fed to the divider head 140 through a feed chute 141. The chute 141 is generally U-shaped in cross section and is supported on the ledge 13 of the main casing 12. It extends from adjacent the roller 37 (Fig. 1) to the head 140 (Figs. 19 and 21) with the width of the chute decreasing toward the head. The casing 15 is fed through the chute 141 by operation of the divider mechanism in the head 140 which exerts a pull on the casing 15.

The divider head 140 comprises a generally circular outer plate or ring member 142 which is secured at the rearward edge to a circular back plate 143, the latter being supported on the forward face of the gear housing 65. The outer plate member 142 is of a depth exceeding twice the diameter of the sausage casing 15. The plate 142 extends circumferentially around the head 140 forming the outer periphery of the divider compartment or housing. The plate or ring member 142 is provided with an aperture at the bottom of the head 140 by cutting loose a strip or section 144 of approximately half the depth of the plate member and extending the same tangentially of the bottom of the head to receive the end 145 of the chute 141 and provide a communicating passageway therebetween so that the casing 15 may be fed forwardly into the head 140 at the bottom thereof. An aperture is formed in a similar manner at the outer side of the bottom of the head 140 to provide a communicating passageway between the head and the throat 75 of the twisting mechanism 74 by a plate portion 146 which is cut loose and bent down on the rearward side and at the bottom of the circular plate member 142.

A divider plate or disk 147, corresponding to disk 58 of the previously described form of the machine, is mounted on the shaft 148 in the head 140. The shaft 148 carries the gear 60 at its other end which is in driving relation with the gear 61 on the drive shaft 62. The divider plate 147 is provided with a pair of oppositely disposed forwardly extending divider fingers or plates 149 which comprise relatively narrow, generally rectangular plate members each attached at the inner end to the forward face of the plate 147 adjacent the periphery thereof. Each of the divider fingers 149 is provided with a recess 150 in the outwardly facing edge thereof. The recesses 150 are located in the ends of the divider fingers 149 adjacent the supporting plate 147. The outer edge of each of the fingers 149, which is recessed at 150, is spaced a relatively small distance from the inner surface of the outer plate member 142 when the supporting plate 147 is mounted in the divider head 140 and extends generally parallel to the surface of the same for substantially the full width of the interior of the divider head. The divider plate 147 rotates in a counterclockwise direction and carries the fingers 149 in a circular path which intersects the path of movement of the filled sausage casing 15 as it moves over the chute portion 145 into the head 140.

A guide or cam plate 151 having an inner cam edge 152 is mounted within the head 140 to guide the sausage from the entrance side to the exit side of the divider compartment as it is moved around the same by the divider fingers 149. The cam plate 151 is secured at its outer edge on the interior surface of an apertured face plate 153. The face plate 153 is secured at the outer edge of the circular plate member 142 by means of bar members 154 and 155 to the outer ends of which radially extending tongues 156 and 157 on the face plate 153 are attached. The forward bar member 154 is attached at the other end to a bracket member 158 extending forwardly of the back plate 143 of the head 140. The rearward supporting bar member 155 is secured at the other end to the bearing support member 67 which connects the shaft housing 66 and the gear housing 65. The cam plate 151 is circular and extends in spaced relation to the inner surface of the circular member 142 with the inner edge 152 in proper tapering relation to guide the casing 15 from the outer side to to inner side of the head 140 as the casing is divided into sausage lengths and delivered out of the head 140, into the twisting throat 75.

A brake member 159 is pivoted at 160 on the outer end of the support rod 161 which is attached to the cross bar 155 and extends rearwardly therefrom. The brake member 159 extends down into the chute 141 for engagement with the casing 15 as it passes through the chute. Torsion spring 162 and tension spring 163 tend to urge the lower end of the brake member 159 into engagement with the casing 15. The brake member 159 may also be connected to the operating and control mechanism of the machine in the same manner as the trip member 54 in the previously described mechanism.

The operation of the head is illustrated in Figs. 23 to 25. The casing 15 is fed into the lower portion of the head 140 with the end of the casing moving ahead of one of the divider fingers 149. As the plate 147 rotates the divider finger 149 engages the casing 15 and pulls it into the head 140. Continued rotation of the plate 147 brings the succeeding divider finger 149 into engagement with the casing 15 at a point spaced the desired length of a sausage link from the point where the casing is engaged by the first divider finger. The distance between the outer edge of the fingers 149 and the inner surface of the plate 142 is relatively small and the fingers 149 operate to constrict the casing 15 at the points of engagement as they move around within the head. The cam edge 152 engages the casing 15 and forces it toward the back portion of the head 140 as it is carried around by the fingers 149 with a small section of the casing being moved into the recess 150 as the fingers complete a cycle and approach the bottom of the head 140. The operation of the twisting mechanism 74 becomes effective as the link 17 in Fig. 25 begins to move into the twisting throat 75 and the twisting operation is completed as link 17 leaves the head 140. The succeeding operations of accumulating the links in a rotatable drum and thereafter transferring them to a supporting bar are the same as previously described in connection with the mechanism of Figs. 1 to 18.

While specific details of construction have been referred to in describing the illustrated forms of the machine herein disclosed it will be understood that other details of construction may be resorted to within the scope of the invention. Also it will be understood that the invention may be employed with products other than the sausage illustrated.

I claim.

1. In a sausage linking machine having a supporting frame structure and means thereon for guiding a filled sausage casing in a predetermined lineal path, a casing constricting mechanism mounted on said frame structure at the end of the lineal path of movement of the casing, said mechanism comprising a disk mounted for rotatable movement in a plane generally parallel to the path of movement of the casing, generally rectangular divider plate members circumferentially spaced on said disk, said divider plate members having recesses in the outer edges thereof opening outwardly of the periphery of said disk, circular cam means arranged parallel to the path of movement of the divider plate members for guiding the casing laterally of said disk and a circular member extending around the periphery of said disk and cooperating with said divider plate members whereby to constrict the casing therebetween at successive spaced points and divide the same into individual sausage links of uniform predetermined length.

2. In a sausage linking machine, a mechanism for dividing a length of filled sausage casing into a plurality of sections of uniform length, said mechanism comprising means forming a circular compartment having an aperture in the bottom thereof, a disk mounted for rotatable movement in an end of said compartment, a feed chute mounted adjacent said compartment forming means for guiding the casing into the aperture in the bottom of said compartment, relatively narrow plate-like divider members circumferentially spaced on said disk and extending laterally of the face of said disk, said divider members having outwardly opening recesses in one edge thereof, said divider members traveling in a path adjacent the peripherial wall of said compartment whereby the filled casing is engaged between successive divider members and said wall to constrict the casing at spaced intervals, casing guiding means arranged in said compartment to move the casing in a spiral path as the rotating divider members engage the same and to bring the casing areas between successive sections into the recesses on the divider members.

3. A sausage linking machine having a supporting structure and means thereon for continuously guiding a filled sausage casing in a predetermined lineal path, a casing dividing and constricting mechanism mounted on said supporting structure at the end of said path, said mechanism including a circular compartment having an entrance passageway along one side in aligned relation with said guiding means to receive therethrough the sausage casing, a rotatable disk mounted in said compartment and having casing engaging fingers in circumferentially spaced relation thereon, said fingers extending axially of said compartment and traveling in a path closely adjacent to the interior periphery of the same, said compartment having an exit passageway in laterally off-set relation to the passageway connecting the same with said guide means and means within said compartment arranged to guide the sausage casing from the entrance passageway to the exit passageway as it is engaged between said fingers and the interior periphery of said compartment and carried around the compartment by rotation of said fingers.

4. In a sausage linking machine, a supporting frame structure, a pair of endless belts mounted on said frame structure for continuously feeding a filled sausage casing therealong, a plate rotatably mounted on said frame structure adjacent the end of said belts and having a pair of casing constricting members thereon, said casing constricting members being operative to engage the casing at intervals and divide the same into successive individual links of predetermined length, a carriage mounted on said frame structure for movement in a path toward and from said casing constricting members, a cylinder rotatably mounted on said carriage for receiving the connected links, drive means operatively connected with said cylinder for rapidly rotating said cylinder about its axis, a twisting and distributing mechanism rotatably mounted adjacent the end of said feeding belts, said twisting and distributing mechanism cooperating with said casing constricting members and said cylinder to impart a twist in the casing area between successive links and to deliver the twisted links within said cylinder, and means operatively connected to said carriage for moving said carriage away from said twisting and distributing mechanism at a speed sufficient to permit the links to be delivered within said cylinder in coiled formation.

5. In a sausage linking machine having a supporting frame structure and means thereon for continuously feeding a filled sausage casing in a predetermined path, a casing constricting mechanism comprising a disk, said disk being mounted on said frame structure for rotatable movement in a plane generally parallel to and adjacent the path of movement of the casing, and laterally extending casing constricting members on the peripheral edge of said disk, said last mentioned members extending into the path of movement of said casing whereby to engage said casing at successive spaced points and divide the same into individual sausage links of uniform predetermined length.

6. In a sausage linking machine having a supporting frame structure and means thereon for continuously feeding a filled sausage casing in a predetermined path, a casing constricting mechanism comprising a circular disk, said disk being mounted on said frame structure for rotatable movement in a plane generally parallel to and adjacent the path of movement of the casing, and oppositely disposed laterally extending casing constricting members on said disk, said casing constricting members having oppositely opening notches in the edges thereof and said casing constricting members extending into the path of movement of said casing whereby to engage said casing in said notches at successive spaced points and divide the same into individual sausage links of uniform predetermined length.

7. In a sausage linking machine having a supporting frame structure and means thereon for continuously feeding a filled sausage casing in a predetermined lineal path, a casing constricting mechanism comprising a disk mounted on said frame structure adjacent said feeding means for rotatable movement in a plane generally parallel to and adjacent the end of the lineal path of movement of the casing, a curved guideway on said frame structure extending from the end of said lineal path to said constricting mechanism for reversing the travel of said casing, and laterally extending generally triangular plate members circumferentially spaced on the face of said disk, said plate members having oppositely opening recesses in the free edges thereof and said plate members being arranged on said disk to extend into the path of movement of said casing whereby to engage said casing at successive spaced points in said recesses and divide the same into individual sausage links of uniform predetermined length.

8. In a sausage linking machine having a supporting frame structure and means thereon for continuously feeding a filled sausage casing in a predetermined lineal path, a casing dividing and constricting mechanism mounted on said frame structure adjacent the end of the lineal path of movement of the casing, and a curved guideway structure on said frame structure extending from the end of said lineal path to said dividing and constricting mechanism for altering the direction of travel of said casing and guiding the same into said dividing and constricting mechanism, said guideway structure having a member mounted for adjustment relative to said lineal path to vary the length of said path and thereby control the tension in said casing as it is guided into said dividing and constricting mechanism.

9. In a sausage linking machine having a supporting frame structure and means thereon for continuously feeding a filled sausage casing in a predetermined lineal path, a casing dividing and constricting mechanism mounted on said frame structure adjacent said feeding means and comprising a rotatable member, casing engaging fingers circumferentially spaced on said member and arranged to engage said casing at intervals to divide the same into links of uniform length, and a curved guideway structure mounted on said frame structure and extending from the end of said lineal path to said dividing and constricting mechanism for altering the direction of travel of said casing and guiding the same into the path of movement of said fingers, said guideway structure including a guide member adjustably mounted relative to said lineal path to vary the length of said path and thereby control the tension in said casing as it is guided into position for engagement by said fingers.

10. In a sausage linking machine having a supporting frame structure and means thereon for continuously feeding a filled sausage casing in a predetermined lineal path, a casing dividing and constricting mechanism comprising a disk member mounted on said frame structure for rotation in a plane adjacent the end of the lineal path of movement of the casing, casing engaging members circumferentially spaced on said disk for engaging said casing at intervals to divide the same into links of uniform length, and a means mounted on said frame structure forming a curved guideway and extending from the end of said lineal path to said dividing and constricting mechanism for substantially reversing the direction of travel of said casing and guiding the same into the path of movement of said fingers, said guideway forming means including a casing guide member adjustably mounted relative to said lineal path to vary the length of said path and thereby control the tension in said casing as it is guided into position for engagement by said fingers.

11. In a sausage linking machine having a supporting frame structure and means thereon for continuously feeding a filled sausage casing in a predetermined lineal path, a casing dividing and constricting mechanism comprising a disk mounted on said frame structure for rotation in a plane adjacent the end of the lineal path of movement of the casing, casing engaging fingers circumferentially spaced on said disk for engaging said casing at intervals to divide the same into links of uniform length, and a curved guideway forming structure mounted on said frame structure and extending from the end of said lineal path to said dividing and constricting mechanism for reversing the direction of travel of said casing and guiding the same into the path of movement of said fingers, said guideway forming structure having a wall member for adjustment relative to said lineal path to vary the length of said path and thereby control the tension in said casing as it is guided into position for engagement by said fingers.

12. In a sausage linking machine having a supporting frame structure and means thereon for continuously feeding a filled sausage casing in a lineal path, a casing constricting mechanism comprising a circular compartment forming structure mounted on said frame structure and offset relative to the path of movement of the casing, a circular disk rotatably mounted in said compartment, circumferentially spaced laterally extending generally triangular plate members on said disk, said plate members having oppositely opening notches in the edges thereof and means mounted on said frame structure for guiding said casing from said lineal path of movement into said compartment whereby to engage said casing in the notched edges of said plate members at successive spaced points and divide the same into a plurality of individual sausage links of uniform length upon rotation of said circular disk.

13. In a sausage linking machine as recited in claim 12 and a hollow twisting head mounted on said frame structure and providing a passageway extending forwardly of said compartment, means operatively connected to said twisting head for rapidly rotating the same whereby to impart a twist in the casing area between each sausage link and the next succeeding link as the links are formed.

14. In a sausage linking machine having a supporting frame structure and means thereon for continuously feeding a filled sausage casing in a predetermined path, a casing constricting mechanism comprising a disk mounted on said frame structure for rotatable movement in a plane generally parallel to and adjacent the path of movement of the casing, and laterally extending generally triangular plate members on the peripheral edge of said disk, said disk being so located relative to the path of movement of the casing that said plate members extend into the path of movement of said casing, and said plate members having outwardly opening, generally V-shaped recesses in the opposite side edges thereof whereby to engage said casing at successive spaced points and divide the same into a plurality of connected sausage links of uniform length.

15. In a sausage linking machine having a supporting frame structure and means thereon for continuously feeding a filled sausage casing in a predetermined lineal path, a casing dividing mechanism comprising a compartment forming structure mounted on said frame structure adjacent the end of said lineal path, a divider plate rotatably mounted in said compartment, casing divider elements on said divider plate, a guideway formation on said frame structure extending from said lineal path to said compartment to deliver the casing into said compartment and into engagement with said divider elements, a twisting mechanism comprising a throat ring rotatably mounted on said frame structure adjacent said compartment, and a hollow distributing horn rotatably mounted on said frame structure with the interior thereof in communication with the interior of said throat ring, said throat ring being in communication with said compartment and receiving therethrough the divided casing.

16. In a sausage linking machine, a supporting frame structure, means on said frame structure for feeding a continuous length of filled sausage casing in a predetermined path, means on said frame structure and operative in the path of travel of the casing for constricting the same at intervals to divide the casing into successive individual links of predetermined length, an open ended container mounted on said frame structure and positioned relative to said casing constricting means for receiving the connected links therefrom, means operatively connected to said container for rotating said container in a plane transversely of the path of travel of the links, means operatively connected to said container for moving said container in a predetermined lineal path along its axis of rotation, means mounted on said frame structure and cooperating with said casing constricting means and said container for imparting a twist between each link and the next succeeding link and for depositing the links in coil formation in said container and a link receiving structure comprising a vertical post on said frame structure having mounted thereon a plurality of movable supporting bars adapted to be selectively positioned to extend into said container when said container reaches the end of its lineal movement and to accommodate the coil of links when said container ceases its rotational movement.

17. In a sausage linking machine, a supporting frame structure, means on said frame structure for continuously feeding a filled sausage casing in a predetermined path, means on said frame structure and operative in the path of travel of the casing for dividing the casing into individual links of predetermined length, an open ended container mounted on said frame structure and positioned relative to said casing dividing means for receiving the connected links therefrom, means operatively connected with said container for rotating said container in a plane transversely of the path of travel of the links, means operatively connected to said container for moving said container in a lineal direction along its axis of rotation, means on said frame structure cooperating with said dividing means and said container for imparting a twist between each link and the next succeeding link and for depositing the links in a coil in said container and means mounted on said frame structure and arranged in the lineal path of movement of said container for receiving the coil of links when said container comes to rest, said coil receiving means comprising a plurality of bar members each pivotally supported at one end on a rotatable hub member, a supporting member for said hub member mounted on said frame structure and cooperating control elements on said bar members and said hub member whereby said bar members may be selectively indexed into a position to receive thereover said container when the latter is moved in the lineal direction a predetermined distance from said twist imparting means.

18. A sausage linking machine having a supporting frame structure and a guide chute thereon for continuously guiding a filled sausage casing in a predetermined lineal path, a casing dividing and constricting mechanism on said frame structure at the end of said path, said mechanism including a circular member forming a tube-like chamber having an entrance aperture in the side thereof, said chamber forming member being arranged with said entrance aperture in communicating relation with said chute to receive therethrough the sausage casing, a disk rotatably mounted in one end of said chamber and having casing engaging fingers extending into said chamber in circumferentially spaced relation thereon, said fingers traveling in a path closely adjacent to the interior of the side wall of said chamber, said side wall having an exit aperture in laterally offset relation to said entrance aperture and a guide member within said chamber characterized by a spiral cam edge arranged to guide the sausage casing in a spiral path from the entrance to the exit as it is engaged between said fingers and said side wall and carried around said chamber by rotation of said fingers.

19. A sausage linker comprising in combination means for feeding and guiding a filled sausage casing in a lineal path, casing constricting means mounted for movement in a circular path at the end of said lineal path, means operatively associated with said constricting means for guiding the casing in a circular path whereby the same is constricted at spaced intervals and divided into a plurality of successive links of uniform length by movement of said constricting means, means adjacent the end of said lineal path rotatably mounted on an axis generally parallel with said lineal path for rotating the successive links axially to impart a twist between each link and the next succeeding link, a container operatively associated with said link rotating means for receiving the links, and means operatively connected to said container for rotating the same to arrange the links in coil formation therein.

20. A machine for dividing a filled sausage casing of predetermined length into a plurality of links of uniform length and depositing the same in coil formation on a supporting bar comprising, in combination, means for feeding and guiding the casing in a linear path, means at the end of said linear path for guiding the casing in a generally reverse direction and to one side of said lineal path, means forming a compartment having apertures therein arranged adjacent said casing reversing means for receiving the casing through one of said apertures, means in said compartment for engaging the casing in constricting relation at spaced intervals and dividing the same into links while simultaneously feeding the links forwardly through the other of said apertures, cooperating twisting and accumulating mechanism arranged adjacent said compartment forming means for receiving therefrom the successive links, means operatively connected to said twisting and accumulating mechanism to rotate the same whereby to impart a twist in the same direction between each link and the next succeeding link and to arrange the links in coil formation, bar supporting means arranged in forwardly spaced relation to said twisting and accumulating mechanism, and means operatively connected to said accumulating mechanism to move the same bodily into position relative to said bar supporting means to deposit the coil of links thereon upon discontinuing the rotation thereof.

21. A sausage linking machine having a supporting frame structure, means on said frame structure for guiding a filled sausage casing in a predetermined path, a casing dividing and constricting mechanism on said frame structure at the end of said path, said mechanism including means forming a circular chamber having an entrance aperture in the side wall thereof for receiving the sausage casing from said guiding means, a disk rotatably mounted in said chamber and having casing engaging members circumferentially spaced thereon and extending laterally of the path of movement of the advancing sausage, said casing engaging members traveling in a circular path adjacent to the interior side wall of said chamber, said side wall having a discharge aperture in laterally offset relation to said receiving aperture and means in said chamber for guiding the sausage in a spiral path from the receiving aperture to the discharge aperture as the sausage is engaged between said casing engaging members and the side wall and carried around said chamber by rotation of said disk.

22. In a sausage linking machine having a supporting frame structure and means thereon for continuously advancing a filled sausage casing in a predetermined path, mechanism on said frame for engaging the casing at intervals to divide the same into successive individual links of predetermined length and a twisting mechanism on said frame adjacent said dividing mechanism for imparting a twist in the casing between each link and the next succeeding link as the divided casing is advanced, said twisting mechanism comprising a throat ring rotatably mounted on said frame and a hollow horn rotatably mounted on said frame, the interior of said horn being in communication with said throat ring for receiving the advancing links therethrough and said horn extending radially outwardly of the axis of rotation thereof.

23. In a sausage linking mechanism, an elongate supporting frame, means at one end of the supporting frame for advancing the stuffed sausage casing in a predetermined path toward the other end of the supporting frame, means for dividing the casing into successive links as the casing advances, a support member extending transversely of the supporting frame adjacent the dividing means and having a relatively small opening therein forming a passageway for receiving the links therethrough, a rotatable throat member mounted in said opening having an axially and radially directed passageway for the links, a cylindrical open-ended container, means on the supporting frame for mounting said container for rotatable movement about its longitudinal axis, said axis extending in the direction of the advancing movement of the casing, said container mounting means being movable toward and from a predetermined position at the other end of said supporting frame, means at the other end of said supporting frame for receiving the links from said container when it is moved to said predetermined position, means for rapidly rotating said container about its longitudinal axis, and means for moving the container mounting means from an initial position where the rotatable throat member is adjacent the one end thereof towards the other end of the supporting frame with a relatively slow movement until the throat member is adjacent the other end of the container and thereafter with a more rapid movement to the other end of the supporting frame to position the same for delivery of the links to the link receiving means.

24. In a sausage linking machine, a supporting frame structure, means mounted on said frame structure for advancing a filled sausage casing, means mounted adjacent said casing advancing means and operative in the path of travel of the casing for constricting the same at intervals to divide the casing into individual links of predetermined length, a hollow container mounted on said frame structure and positioned relative to said casing constricting means for receiving the connected links, means connected to said container for rapidly rotating the same in a plane transverse to the path of movement of the links, means operative between and cooperating with said casing constricting means and said container for imparting a twist between each link and the next succeeding link and thereafter depositing the links in said rotating container, and means connected to said container for moving said container along its axis of rotation while said container is rotating and the links are being deposited therein with the speed of axial movement of said container being timed to cause the links to be arranged in single coil formation around the inner periphery of said container as they are deposited therein.

25. In a sausage linking machine, a supporting frame structure, means on said frame structure for advancing a filled sausage casing, means adjacent said casing advancing means for constricting the casing at intervals to divide the casing into individual links of predetermined length, an open ended tube-like container rotatably mounted on said frame structure adjacent to and aligned with said casing constricting means for receiving the connected links therein, means connected to said container for rapidly rotating said container in a plane transverse to the path of travel of the links, means on said frame structure between said casing constricting means and said container and cooperating with said casing constricting means for imparting a twist between each link and the next succeeding link and thereafter depositing the links in said container, and means connected to said container for moving said container relatively slowly in the direction of the axis of rotation while said links are deposited therein to position the links in single coil formation.

26. In a sausage linking machine, a supporting frame structure, means on said frame structure for guiding a filled sausage casing along a predetermined path, means adjacent said guiding means for constricting the casing at intervals to divide the casing into individual links of predetermined length, an open-ended container mounted on said frame structure and extending forwardly of said casing constricting means in the direction of travel of the casing for receiving the connected links, means connected to said container for rapidly rotating said container in a plane extending transversely of the path of travel of the links, means mounted between said casing constricting means and said container and cooperating with said casing constricting means and said container for imparting a twist between each link and the next succeeding link and for depositing the links successively in said container, means connected to said container for moving the same in a lineal direction along its axis of rotation in timed relation to the deposit of said links therein whereby to arrange said links in open coil formation within said container, and link supporting means on said frame structure for automatically receiving the coil of links from said container, said link supporting means being arranged in the lineal path of movement of said container whereby the open coil of links is deposited thereon when said container moves to a predetermined position and its rotation is discontinued.

27. In a sausage linking machine, a supporting frame structure, means on said frame structure for advancing a length of filled sausage casing, means on said frame structure adjacent said casing advancing means for constricting the same at intervals to divide the casing into successive individual links of predetermined length, an open-ended tube-like link accumulating container mounted on said frame structure adjacent said casing constricting means, means connected to said container for rotating said container in a plane transverse to the path of travel of the links, means operatively connected to said container for moving said container in a predetermined lineal path along its axis of rotation in timed relation to its speed of rotation, means on said frame structure adjacent said casing constricting means and cooperating with said casing constricting means and said container for imparting a twist between each link and the next succeeding link and for depositing the twisted links in an open coil on the inner wall of said container, a movable supporting bar mounted on said frame in a position to extend into said container and within said coil of links when said container reaches the end of its lineal movement whereby to automatically receive in supported relation thereon the coil of links when said container ceases its rotational movement.

28. In a sausage linking machine, a supporting frame structure, means on said frame structure for continuously advancing a filled sausage casing along a predetermined path, casing constricting means mounted on said frame structure and operative on said casing to constrict the casing at intervals and divide the same into successive individual links of predetermined length, a rotatable cylindrical container mounted on said frame structure for lineal movement in the direction of its axis of rotation, said container being initially positioned with an end portion of said casing constricting means projecting within the same for depositing therein the connected links, means operatively connected to said container for rapidly rotating said container about its axis, twisting and distributing mechanism rotatably mounted on said frame structure adjacent said end of said casing constricting means, said twisting and distributing mechanism cooperating with said casing constricting means and said container to impart a twist in the area between successive links and to deliver the twisted links into said container, and means operatively connected to said container for imparting a relatively slow linear movement to said container in the direction of advancing movement of the links and away from said twisting and distributing mechanism to cause the links to be delivered in an open single coil formation within said container.

29. In a sausage linking machine, a supporting frame structure, means on said frame structure for continuously feeding a filled sausage casing along a predetermined path, casing constricting means mounted at one end of said frame structure and operative on said casing to constrict the casing at intervals and divide the same into successive individual links of predetermined length, a cylindrical container mounted on said frame structure for lineal movement in a predetermined path, which path extends from an initial position encompassing portions of said casing constricting means to a predetermined point adjacent the other end of said frame structure, means operatively connected to said container for rapidly rotating said container about its axis, twisting and distributing mechanism rotatably mounted on said frame structure adjacent the end of said casing constricting means and operative to impart a twist in the area between each link and the next succeeding link and to deliver the twisted links into said container as it rotates and simultaneously moves along its path of lineal movement, and means including a bar member mounted on said frame structure and extending into said container when said container comes to rest at the end of its path of lineal movement for receiving the connected links in looped arrangement thereon.

30. In a sausage linking machine, a supporting frame structure, means on said frame structure for continuously advancing a filled sausage casing in a predetermined path, means adjacent said casing advancing means for constricting the casing at intervals to divide the casing into individual links of predetermined length, an open ended tube-like container for receiving the connected links, said container being mounted on said frame structure and spaced forwardly of said casing constricting means in the direction of the advancing movement of the connected links, means operatively connected to said container for rotating said container in a plane extending transversely of the path of the links, means operatively connected to said container for moving said container along its axis of rotation while it is rotating, and twisting and distributing means mounted on said frame structure between said casing constricting means and said container and cooperating with said casing constricting means and said container to impart a twist between each link and the next succeeding link and to deposit the links in a coil in said container, said twisting and distributing means comprising a rapidly rotating throat ring and a hollow distributing tube secured thereto in communication with said throat ring, said throat ring being mounted on said frame structure for rotation about an axis substantially coinciding with the axis of rotation of said container and said distributing tube extending therefrom at an angle relative to said axis.

31. In a sausage linking machine, a supporting frame structure, means on said frame structure for continuously feeding a filled sausage casing and guiding the same in a predetermined path, casing constricting means adjacent said feeding and guiding means which is operative to constrict the casing at intervals and divide the same into individual links of predetermined length, a cylindrical container movably mounted on said frame structure and initially positioned relative to said casing constricting means for receiving the connected links therein, means operatively connected with said container for rapidly rotating said container about its axis and for simultaneously advancing said container relatively slowly in the direction of its axis of rotation, a throat ring rotatably mounted between said casing constricting means and said container and a hollow distributing tube secured in angular relation to said throat ring for cooperating with said casing constricting means and said container to impart a twist in the areas between successive links and to deliver the twisted links in open coil formation into said slowly advancing and rapidly rotating container.

32. In a sausage linking machine, a supporting frame structure, means on said frame structure for continuously feeding a filled sausage casing in a predetermined path, casing constricting members mounted adjacent said casing feeding means and operative to constrict the casing at intervals and divide the same into successive individual links of predetermined length, a cylindrical container mounted on said frame structure for movement in a predetermined lineal path toward and from said casing constricting members, means operatively associated with said container for rapidly rotating said container about its cylindrical axis, twisting and distributing mechanism mounted on said frame structure and positioned initially adjacent one end of said container for cooperating with said casing constricting members and said container to impart a twist in the area between successive links and to deliver the twisted links into said container as it rotates, means for moving the container along its lineal path simultaneously with the rotation thereof whereby the links are deposited in a single open coil formation therein, and a plurality of bars movably mounted on said frame structure at the end of the path of lineal movement of said container, said bars being adapted to be selectively positioned to extend into the open coil of connected links and receive the same in looped arrangement thereon when said container reaches the end of its lineal movement.

33. In a machine for forming a length of stuffed casing into short serially connected links, a tubular container in which the connected links accumulate, means for supporting the container and for rotating the same on its axis during the formation of the links, means mounted at one end of the container which is operative on the stuffed casing to divide the same into a plurality of link forming sections, means associated with said casing dividing means and said container for moving the container and said casing dividing means relative to each other whereby to initially position a portion of said casing dividing means within the container and adjacent the opposite end thereof and thereafter to withdraw the casing dividing means from the container while the container is rotating and the links are being divided and deposited in the container whereby to cause the links to arrange themselves in a coil about the inner periphery of the container and remain in such position under centrifugal force.

34. In a machine for forming a length of stuffed casing into short serially connected links, an open ended tubular container in which the connected links accumulate, means for supporting the container and for rotating the same on its axis during the formation of the links, means mounted at one end of the container which is operative on the stuffed casing to advance the casing and divide the same into a plurality of link forming sections, said casing advancing and dividing means being operative to deliver the links at the leading end thereof into the rotating container, means associated with said casing advancing and dividing means and said container for moving the container relative to said casing advancing and dividing means whereby to position the leading end of the casing advancing and dividing means within the container and adjacent the leading end of the container and thereafter to withdraw the casing advancing and dividing means from the container while the container is rotating and the links are being divided and deposited in the container whereby to cause the links to arrange themselves in a coil about the inner periphery of the container and remain in such position under centrifugal force.

35. In a machine for forming a length of stuffed casing into a plurality of short connected links, means for dividing the casing into portions of uniform length and for constricting the casing between the divided portions to form successive links, a cylindrical receptacle rotatably mounted adjacent said dividing and constricting means for accumulating the connected links therein, means cooperating with said dividing and constricting means and with said receptacle for imparting a twist in the constricted casing between each link and the next succeeding link and for delivering the successive links into said receptacle, through one end thereof, means for rapidly rotating said receptacle and for moving said receptacle and said twist imparting means relative to each other to cause the links to arrange themselves in an open coil about the inner periphery of the container and remain in such position under centrifugal force, a member for removing the coil of links from the other end of said receptacle, and means for moving said member and said receptacle relative to each other to position said member within the coil of links while said receptacle is rotating and said links are being formed whereby to deposit the coil of links in suspended relation on said member when the rapid rotation of said receptacle is discontinued.

References Cited in the file of this patent

UNITED STATES PATENTS

| Number | Name | Date |
|---|---|---|
| 1,545,586 | Kruse | July 14, 1925 |
| 2,229,590 | Popp | Jan. 21, 1941 |
| 2,325,769 | Haag | Aug. 3, 1943 |
| 2,356,099 | Swoboda | Aug. 15, 1944 |
| 2,477,031 | Armbrust | July 26, 1949 |
| 2,482,911 | Holstein | Sept. 27, 1949 |
| 2,492,222 | Jacobson | Dec. 27, 1949 |

FOREIGN PATENTS

| Number | Country | Date |
|---|---|---|
| 20,096 | Great Britain | 1912 |